United States Patent
Lee et al.

(10) Patent No.: US 10,548,024 B2
(45) Date of Patent: *Jan. 28, 2020

(54) CLOUD COMMUNICATION CENTER SYSTEM AND METHOD FOR PROCESSING DATA IN A CLOUD COMMUNICATION SYSTEM

(71) Applicant: KT CORPORATION, Gyeonggi-do (KR)

(72) Inventors: Ki-Ho Lee, Kyunggi-do (KR); Jong-Ho Park, Kyunggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,970

(22) Filed: Aug. 10, 2015

(65) Prior Publication Data

US 2015/0350922 A1 Dec. 3, 2015

Related U.S. Application Data

(63) Continuation of application No. 14/474,266, filed on Sep. 1, 2014, which is a continuation of application
(Continued)

(30) Foreign Application Priority Data

Dec. 22, 2010 (KR) .................. 10-2010-0132487

(51) Int. Cl.
*H04W 16/18* (2009.01)
*H04W 88/08* (2009.01)
(Continued)

(52) U.S. Cl.
CPC ............ *H04W 16/18* (2013.01); *H04W 4/00* (2013.01); *H04W 72/0413* (2013.01);
(Continued)

(58) Field of Classification Search
CPC ....... H04W 16/18; H04W 4/00; H04W 4/003; H04W 72/0413; H04W 80/02;
(Continued)

(56) References Cited

U.S. PATENT DOCUMENTS 5,864,760 A 1/1999 Gilhousen et al.
6,081,714 A 6/2000 Wakizaka
(Continued)

FOREIGN PATENT DOCUMENTS

KR 10-0304781 B1 9/2001
KR 10-2005-0068400 A 7/2005
(Continued)

OTHER PUBLICATIONS

ETSI TS 123 272 V8. 1. 0, "Digital cellular telecommunications system (Phase 2+); Universal Mobile Telecommunications System (UMTS); Circuit Switched (CS) fallback in Evolved Packet System (EPS); Stage 2"; ETSI, Nov. 2008, pp. 1-47.
(Continued)

*Primary Examiner* — Dung B Huynh
(74) *Attorney, Agent, or Firm* — IP Legal Services, LLC

(57) ABSTRACT

Cloud communication center system and method for processing data in a cloud communication system. An apparatus for supporting a cloud communication system may include at least one remote unit and a centralized unit. The at least one remote unit may be configured to process one of radio signals received from a user equipment or radio signals to be transmitted to a user equipment according to at least one sub-layer of an open system interconnection reference model. The centralized unit may be configured to receive the processed signal from the remote unit and to process the received signal based on the remaining sub-layers of the open system interconnection reference model.

14 Claims, 6 Drawing Sheets

Related U.S. Application Data

No. 13/326,734, filed on Dec. 15, 2011, now Pat. No. 8,862,170.

(51) Int. Cl.

| | | |
|---|---|---|
| *H04W 4/00* | (2018.01) | |
| *H04W 72/04* | (2009.01) | |
| *H04W 80/02* | (2009.01) | |
| *H04W 80/04* | (2009.01) | |
| *H04W 80/06* | (2009.01) | |
| *H04W 92/10* | (2009.01) | |

(52) U.S. Cl.
CPC .......... *H04W 88/085* (2013.01); *H04W 80/02* (2013.01); *H04W 80/04* (2013.01); *H04W 80/06* (2013.01); *H04W 92/10* (2013.01)

(58) Field of Classification Search
CPC ... H04W 80/04; H04W 80/06; H04W 88/085; H04W 92/10; H04B 7/022–026
See application file for complete search history.

(56) References Cited

U.S. PATENT DOCUMENTS

| | | | |
|---|---|---|---|
| 6,466,790 B2 | 10/2002 | Haumont et al. | |
| 6,473,442 B1 | 10/2002 | Lundsjo et al. | |
| 6,526,028 B1 | 2/2003 | Kondo | |
| 6,728,919 B1 | 4/2004 | Kondo et al. | |
| 6,845,238 B1 | 1/2005 | Muller | |
| 6,975,604 B1 | 12/2005 | Ishida | |
| 7,072,655 B2 | 7/2006 | Ikeda et al. | |
| 7,184,418 B1* | 2/2007 | Baba | H04L 29/06027 370/331 |
| 7,200,403 B2 | 4/2007 | Hamabe | |
| 7,236,470 B1* | 6/2007 | Bims | H04B 7/022 370/328 |
| 7,639,655 B2* | 12/2009 | Bione | H04L 49/351 370/338 |
| 7,796,514 B2 | 9/2010 | Noriega | |
| 8,045,926 B2 | 10/2011 | Martikkala et al. | |
| 8,149,895 B2 | 4/2012 | Bolourchi et al. | |
| 8,165,089 B2 | 4/2012 | Jung et al. | |
| 8,379,567 B2 | 2/2013 | Cho et al. | |
| 8,406,193 B2 | 3/2013 | Cho et al. | |
| 8,446,869 B2 | 5/2013 | Lee et al. | |
| 8,472,921 B2 | 6/2013 | Yang et al. | |
| 8,472,941 B1* | 6/2013 | Hong | H04W 24/10 455/423 |
| 8,509,783 B2 | 8/2013 | Iwamura | |
| 8,526,999 B2* | 9/2013 | Nakayama | H04B 1/18 375/267 |
| 8,867,432 B2 | 10/2014 | Lee et al. | |
| 8,868,086 B2 | 10/2014 | Lee et al. | |
| 9,048,886 B2* | 6/2015 | Huang | H04B 7/024 |
| 9,161,388 B2* | 10/2015 | Alamshahi | H04W 88/085 |
| 2001/0007554 A1 | 7/2001 | Hanninen | H04W 28/22 370/337 |
| 2001/0011019 A1 | 8/2001 | Jokimies | |
| 2002/0001296 A1* | 1/2002 | Lee | H04L 1/0066 370/338 |
| 2002/0021698 A1* | 2/2002 | Lee | H04B 7/2612 370/394 |
| 2002/0068546 A1* | 6/2002 | Plush | H04M 15/00 455/406 |
| 2003/0002467 A1* | 1/2003 | Leung | H04W 28/06 370/338 |
| 2003/0022683 A1* | 1/2003 | Beckmann | H04W 72/005 455/518 |
| 2003/0035423 A1* | 2/2003 | Beckmann | H04W 72/005 370/390 |
| 2003/0046413 A1 | 3/2003 | Sakakura | |
| 2003/0101274 A1* | 5/2003 | Yi | H04L 47/10 709/232 |
| 2004/0001436 A1* | 1/2004 | Cuffaro | H04L 1/1628 370/230 |
| 2004/0009773 A1 | 1/2004 | Kato | |
| 2004/0013105 A1* | 1/2004 | Ahmavaara | H04L 1/1819 370/349 |
| 2004/0017783 A1 | 1/2004 | Szentesi et al. | |
| 2004/0024791 A1 | 2/2004 | Martin et al. | |
| 2004/0057543 A1* | 3/2004 | Huijgen | H04J 3/0682 375/356 |
| 2004/0076179 A1* | 4/2004 | Kaminski | H04W 4/18 370/466 |
| 2004/0114593 A1* | 6/2004 | Dick | H04L 1/1835 370/389 |
| 2004/0203926 A1 | 10/2004 | Ruutu et al. | |
| 2004/0235510 A1 | 11/2004 | Elicegui et al. | |
| 2005/0005095 A1 | 1/2005 | Meandzija et al. | |
| 2005/0043050 A1* | 2/2005 | Lee | H04W 72/005 455/515 |
| 2005/0048980 A1 | 3/2005 | Kumar et al. | |
| 2005/0053035 A1* | 3/2005 | Kwak | H04W 72/1268 370/331 |
| 2005/0073988 A1* | 4/2005 | Kroth | H04L 1/1874 370/349 |
| 2005/0176437 A1* | 8/2005 | Mir | H04W 56/00 455/450 |
| 2005/0176439 A1 | 8/2005 | Sasaki | |
| 2005/0201407 A1* | 9/2005 | Kim | H04W 56/009 370/432 |
| 2005/0208960 A1* | 9/2005 | Hassan | H04W 52/346 455/522 |
| 2005/0249322 A1 | 11/2005 | Gerlach | |
| 2006/0003696 A1* | 1/2006 | Diaz Cervera | H04W 88/02 455/11.1 |
| 2006/0077923 A1* | 4/2006 | Niwano | H04W 72/1278 370/328 |
| 2006/0092872 A1 | 5/2006 | Lee et al. | |
| 2006/0104229 A1 | 5/2006 | Vannithamby | |
| 2006/0178153 A1 | 8/2006 | Tenny et al. | |
| 2007/0087689 A1 | 4/2007 | Alles et al. | |
| 2007/0155390 A1* | 7/2007 | Kodikara Patabandi | H04W 72/1278 455/450 |
| 2007/0171857 A1* | 7/2007 | Wang | H04L 1/1867 370/328 |
| 2007/0184841 A1 | 8/2007 | Choi et al. | |
| 2007/0190997 A1 | 8/2007 | Moon et al. | |
| 2007/0254671 A1* | 11/2007 | Liu | H04W 88/08 455/446 |
| 2007/0268894 A1* | 11/2007 | Fukui | H04W 84/00 370/389 |
| 2007/0280370 A1* | 12/2007 | Liu | H04B 1/707 375/267 |
| 2008/0045226 A1* | 2/2008 | Liu | H04L 5/0037 455/450 |
| 2008/0139204 A1 | 6/2008 | Hsieh et al. | |
| 2008/0170535 A1* | 7/2008 | Zheng | H04B 7/155 370/315 |
| 2008/0181182 A1* | 7/2008 | Carichner | H04W 56/0015 370/336 |
| 2008/0198808 A1* | 8/2008 | Hwang | H04W 36/06 370/331 |
| 2008/0199183 A1 | 8/2008 | Liu et al. | |
| 2008/0214221 A1* | 9/2008 | Kiyomoto | H04B 7/2609 455/517 |
| 2008/0219222 A1 | 9/2008 | Lo et al. | |
| 2008/0260389 A1* | 10/2008 | Zheng | H04Q 11/0067 398/115 |
| 2008/0267142 A1* | 10/2008 | Mushkin | H01Q 1/2291 370/338 |
| 2008/0310404 A1* | 12/2008 | Valme | H04M 7/006 370/353 |
| 2009/0041056 A1* | 2/2009 | Okamoto | H04W 28/06 370/469 |
| 2009/0116434 A1* | 5/2009 | Lohr | H04L 5/0007 370/329 |
| 2009/0135778 A1 | 5/2009 | Lee et al. | |

(56) References Cited

U.S. PATENT DOCUMENTS

| | | |
|---|---|---|
| 2009/0149221 A1* | 6/2009 | Liu .................. H04W 88/085 455/561 |
| 2009/0233616 A1 | 9/2009 | Kwon et al. |
| 2009/0238143 A1 | 9/2009 | Mukherjee et al. |
| 2009/0291632 A1 | 11/2009 | Braithwaite et al. |
| 2009/0310568 A1 | 12/2009 | Chen et al. |
| 2010/0008324 A1 | 1/2010 | Lee et al. |
| 2010/0015978 A1 | 1/2010 | Yoon et al. |
| 2010/0039942 A1* | 2/2010 | Nakatsuji ............ H04W 28/06 370/241 |
| 2010/0067442 A1 | 3/2010 | Van der Wal et al. |
| 2010/0075678 A1* | 3/2010 | Akman ................ H04W 24/06 455/436 |
| 2010/0075679 A1 | 3/2010 | Tenny et al. |
| 2010/0113032 A1 | 5/2010 | Lee et al. |
| 2010/0128663 A1 | 5/2010 | Kuroda et al. |
| 2010/0136979 A1 | 6/2010 | Yang et al. |
| 2010/0144334 A1 | 6/2010 | Gorokhov et al. |
| 2010/0178916 A1 | 7/2010 | Jamadagni |
| 2010/0178936 A1* | 7/2010 | Wala .................. G01S 5/0054 455/456.2 |
| 2010/0208777 A1* | 8/2010 | Ogaz .................. H04L 12/2838 375/219 |
| 2010/0216474 A1 | 8/2010 | Park et al. |
| 2010/0273485 A1 | 10/2010 | Huang et al. |
| 2010/0278146 A1 | 11/2010 | Aoyama et al. |
| 2010/0278150 A1 | 11/2010 | Park et al. |
| 2010/0296485 A1* | 11/2010 | Kobori .............. H04W 36/0055 370/331 |
| 2011/0013560 A1 | 1/2011 | Zhang et al. |
| 2011/0016214 A1 | 1/2011 | Jackson |
| 2011/0022812 A1 | 1/2011 | van der Linden et al. |
| 2011/0092214 A1 | 4/2011 | Iwamura |
| 2011/0096736 A1* | 4/2011 | Kwon .................. H04W 16/24 370/329 |
| 2011/0116513 A1 | 5/2011 | Gilson |
| 2011/0176477 A1 | 7/2011 | Lee et al. |
| 2011/0176485 A1 | 7/2011 | Pudney et al. |
| 2011/0207459 A1 | 8/2011 | Ramasamy et al. |
| 2011/0237272 A1 | 9/2011 | Gorokhov et al. |
| 2011/0268033 A1* | 11/2011 | Boldi .................. H04B 7/022 370/328 |
| 2011/0274014 A1* | 11/2011 | Du ..................... H04W 24/02 370/278 |
| 2011/0274040 A1 | 11/2011 | Pani et al. |
| 2011/0287791 A1* | 11/2011 | Fujishima ............ H04B 7/024 455/500 |
| 2011/0300887 A1 | 12/2011 | Osterling |
| 2011/0310941 A1* | 12/2011 | Kenington .......... H04W 88/085 375/220 |
| 2011/0312355 A1 | 12/2011 | Cheng et al. |
| 2012/0039216 A1 | 2/2012 | Li et al. |
| 2012/0165055 A1* | 6/2012 | Lee .................... H04W 88/085 455/507 |
| 2012/0213128 A1* | 8/2012 | Miyata ................ H04B 7/0426 370/277 |
| 2012/0221683 A1 | 8/2012 | Ferris |
| 2012/0322477 A1 | 12/2012 | Kang et al. |
| 2013/0028210 A1* | 1/2013 | Gage .................. H04B 7/0413 370/329 |
| 2013/0089021 A1 | 4/2013 | Gaal et al. |
| 2013/0103844 A1 | 4/2013 | Bulut et al. |
| 2013/0163416 A1 | 6/2013 | Lee et al. |
| 2013/0223350 A1* | 8/2013 | Kang .................. H04B 7/024 370/328 |
| 2013/0242951 A1 | 9/2013 | Lee et al. |
| 2013/0322346 A1* | 12/2013 | Comeau .............. H04W 80/02 370/329 |
| 2014/0052864 A1 | 2/2014 | Van Der Linden et al. |
| 2014/0226736 A1* | 8/2014 | Niu .................... H04L 27/2628 375/260 |

FOREIGN PATENT DOCUMENTS

| | | |
|---|---|---|
| KR | 10-2005-0121136 A | 12/2005 |
| KR | 10-2006-0016016 A | 2/2006 |
| KR | 10-2006-0040237 A | 5/2006 |
| KR | 10-2007-0079633 A | 8/2007 |
| KR | 10-2007-0110348 A | 11/2007 |
| KR | 10-2008-0026855 A | 3/2008 |
| KR | 10-2008-0041543 A | 5/2008 |
| KR | 10-2008-0041545 A | 5/2008 |
| KR | 10-2008-0064691 A | 7/2008 |
| KR | 10-2008-0080801 A | 9/2008 |
| KR | 10-0873386 B1 | 12/2008 |
| KR | 10-2009-0034261 A | 4/2009 |
| KR | 10-2009-0073443 A | 7/2009 |
| KR | 10-0920894 B1 | 10/2009 |
| KR | 10-2010-003664 A | 1/2010 |
| KR | 10-2010-0004833 A | 1/2010 |
| KR | 10-2010-00211 56 A | 2/2010 |
| KR | 10-2010-0029869 A | 3/2010 |
| KR | 10-2010-0035088 A | 4/2010 |
| KR | 10-2010-0048841 A | 5/2010 |
| KR | 10-2010-0060353 A | 6/2010 |
| KR | 10-2010-0066875 A | 6/2010 |
| KR | 10-2010-0087382 A | 8/2010 |
| KR | 10-2010-0092742 A | 8/2010 |
| KR | 10-0976943 B1 | 8/2010 |
| KR | 10-2010-0126776 A | 12/2010 |
| KR | 10-2010-0126818 A | 12/2010 |
| KR | 10-2010-0133821 A | 12/2010 |
| KR | 10-1030897 B1 | 4/2011 |
| KR | 10-2011-0094140 A | 8/2011 |
| KR | 10-2011-0097702 A | 8/2011 |
| KR | 10-2011-0099327 A | 9/2011 |
| WO | 2008/100924 A2 | 9/2008 |
| WO | 2010/068769 A1 | 6/2010 |
| WO | 2010/123270 A2 | 10/2010 |
| WO | 2010/127365 A1 | 11/2010 |
| WO | 2011/022733 A2 | 2/2011 |

OTHER PUBLICATIONS

Ralf Irmer et al., "Coordinated multipoint: Concepts, Performance, and Field Trial Results", IEEE Communications Magazine, Feb. 2011, pp. 102-111, vol. 49, Issue 2.

* cited by examiner

CLOUD COMMUNICATION CENTER SYSTEM AND METHOD FOR PROCESSING DATA IN A CLOUD COMMUNICATION SYSTEM

CROSS REFERENCE TO PRIOR APPLICATIONS

The present application is continuation application of U.S. patent application Ser. No. 14/474,266 (filed on Sep. 1, 2014), which is continuation application of U.S. patent application Ser. No. 13/326,734 (filed on Dec. 15, 2011), now issued as U.S. Pat. No. 8,862,170, which claims priority under 35 U.S.C. § 119 to Korean Patent Application No. 10-2010-0132487 (filed on Dec. 22, 2010), which is hereby incorporated by reference in its entirety.

FIELD OF THE INVENTION

Apparatuses and methods consistent with the present invention relate to a cloud communication center network technology, and more particularly, to a cloud communication center system and a method for processing data in a cloud communication center system.

BACKGROUND OF THE INVENTION

A cloud communication center network technology has been introduced to more efficiently utilize network resources. The cloud communication center network technology may greatly reduce operational expenditure and power consumption while increasing radio data capacity. Due to such advantages, the cloud communication center network technology has attracted much attention.

Typically, a radio unit and a digital unit are implemented as a single equipment and installed at a base station. The digital unit is connected to a switching system located at a central office, the radio unit transmits and receives a radio signal to/from a user equipment, and the digital unit processes the radio signal in accordance with an open system interconnection model (OSI) such as a radio Internet protocol.

Unlike the typical base station equipment, a cloud communication center network includes a digital unit and a radio unit separated and installed at different locations. For example, a radio unit may be installed at a base station in a respective target service area, and a plurality of digital units may be centralized in a digital unit center at a central office with a switching system. The radio unit may be coupled to a corresponding one of the digital units in the digital unit center through an optical interface. In order for smooth communication between the radio unit and the digital unit, the optical interface typically needs to support a data transmission rate of about 2.5 gigabits per second (Gbps) or more. Due to such requirements, the cloud communication center network may require expensive operating expenditure (OPEX) to maintain such an optical interface. Furthermore, a processing load for processing a radio signal in accordance with the OSI is concentrated at the digital unit center at the central office. Accordingly, the digital unit center requires a large amount of resources and high processing power as compared to the radio unit at the base station. Such a processing load may cause a delay in communication between the radio units and the digital unit center.

Therefore, there is a need for improving a cloud communication center network for reducing OPEX and distributing processing load by efficiently utilizing network resources.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a remote unit and a centralized unit may be installed at different locations, and the remote unit, together with the centralized unit, may process a radio signal to be transmitted to or received from at least one user equipment according to sub-layers of an open system interconnection reference model.

In accordance with another aspect of the present invention, the remote unit may process a radio signal to be transmitted to or received from at least one user equipment according to at least one sub-layer of an open system interconnection reference model, and the centralized unit may process the radio signal processed by the remote unit according to the remaining sub-layers of the open system interconnection reference model.

In accordance with still another aspect of the present invention, the remote unit may be coupled to the centralized unit through an inter-protocol interface such as an L1/L2 interface.

In accordance with an embodiment of the present invention, an apparatus supporting a cloud communication system may include at least one remote unit and a centralized unit. The at least one remote unit may be configured to process one of radio signals received from a user equipment and radio signals to be transmitted to a user equipment according to at least one sub-layer of an open system interconnection reference model. The centralized unit may be configured to receive the processed signal from the at least one remote unit and to process the received processed signal based on the remaining sub-layers of the open system interconnection reference model.

The at least one remote unit may include a radio unit and an L1 function unit. The radio unit may be configured to control transmission and reception of the radio signal to/from the user equipment. The L1 function unit may be configured to process the radio signal to be transmitted to or received from the user equipment according to an L1 layer of the open system interconnection reference model.

The centralized unit may include an L2/L3 function unit that may be configured to receive the processed radio signal from the remote unit and process the received radio signal according to an L2 layer and an L3 layer of the open system interconnection reference model.

The at least one remote unit may be installed at a base station and the centralized unit may be installed at a central office.

The at least one sub-layer may be an L1 layer, and the remaining sub-layers may be an L2 layer or an L3 layer.

The L1 layer may be a physical layer in a radio interface protocol. The L2 layer may include at least one of a media access control layer, a radio link control layer, and a packet data convergence protocol layer. The L3 layer may be a radio resource control layer.

The at least one remote unit may be coupled to the centralized unit through an inter-protocol interface that connects an uppermost layer of the at least one sub-layer and a lowermost layer of the remaining sub-layers of the open system interconnection reference model.

The inter-protocol interface may be an L1/L2 interface that connects an L1 layer and an L2 layer of the open system interconnection reference model.

The inter-protocol interface may be a transport channel in a radio interface protocol.

The apparatus may further include a control unit that may be configured to control signal transmission and signal reception of the centralized unit and the at least one remote unit.

The control unit may be included in the centralized unit.

In accordance with another embodiment of the present invention, a cloud communication system may include at least one base station and a central office. The at least one base station may be configured to process one of radio signals received from a user equipment and radio signals to be transmitted to a user equipment according to at least one sub-layer of an open system interconnection reference model. The central office may be configured to receive the processed signal from the at least one remote unit and to process the received processed signal based on the remaining sub-layers of the open system interconnection reference model.

The at least one base station may include a remote unit and a physical-layer function unit. The remote unit may be configured to transmit and receive the radio signals to/from the user equipment. The physical-layer function unit may be configured to process the radio signal according to a physical layer of a radio interface protocol. The central office may include a centralized unit that may be configured to process the radio signal from the base station according to at least one of a media access control layer, a radio link control layer, a packet data convergence protocol layer, and a radio resource control layer.

The at least one base station and the central office may be coupled together through an inter-protocol interface supporting a data transmission rate of about hundreds of megabits per second (Mbps). In this case, the inter-protocol interface may be a transport channel that couples the physical layer and the media access control layer.

The central office may include a control unit that may be configured to control signal transmission and signal reception of the at least one base station and the central office.

In accordance with still another embodiment of the present invention, a method is provided for processing a radio signal at a cloud communication center system including a remote unit at a base station and a centralized unit at a central office, the method including: receiving, at the remote unit, a radio signal from at least one user equipment, processing, at the remote unit, the received radio signal according to at least one sub-layer of an open system interconnection reference model, transmitting, from the remote unit, the processed signal to the centralized unit through an inter-protocol interface, and processing, at the centralized unit, the processed signal according to the remaining sub-layers of the open system interconnection reference model at the central office.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
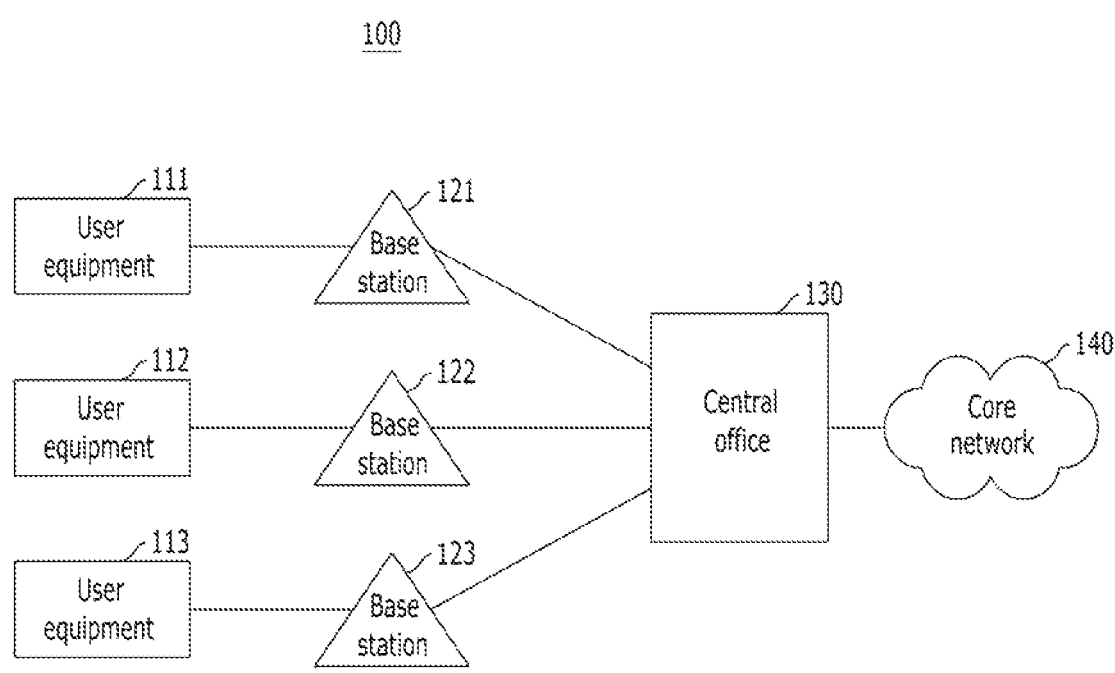
FIG. 1 illustrates a wireless communication network.

Reference will now be made in detail to embodiments of the present invention, examples of which are illustrated in the accompanying drawings, wherein like reference numerals refer to like elements throughout. The embodiments are described below, in order to explain the present invention by referring to the figures.

Unless explicitly described to the contrary, the word "comprise" and variations such as "comprises" or "comprising," will be understood to imply the inclusion of stated elements but not the exclusion of any other elements.

The term "user equipment" as used herein may refer to any of a terminal, a mobile station (MS), a mobile terminal (MT), a subscriber station (SS), a portable subscriber station (PSS), and an access terminal (AT), and may include some or all of the functions thereof.

The term "base station (BS)" as used herein may refer to any of an access point (AP), a radio access station (RAS), a node B, an evolved node B (eNodeB), a base transceiver station (BTS), and a mobile multihop relay (MMR)-BS, and may include some or all of the functions thereof.

For convenience and ease of understanding, the following description will be directed towards a $3^{rd}$ Generation Partnership Project (3GPP) system, however, it is merely exemplary and the present invention can also be applied to any type of communication system (e.g., IEEE) supporting cloud communication center network technology.

FIG. 1 illustrates a wireless communication network.

Referring to FIG. 1, a wireless communication network 100 may include user equipments 111 to 113, base stations 121 to 123, a central office 130, and a core network 140.

User equipments 111 to 113 may receive various types of radio signals, such as data signals and voice signals, from the central office 130 through one of the base stations 121 to 123. The user equipments 111 to 113 may be coupled to one of the base stations 121 to 123 through a radio link.

The base stations 121 to 123 may provide a broadcast service, a multicast service, and/or a unicast service to the user equipments 111 to 113 by simultaneously transmitting multiple data streams. The base stations 121 to 123 may also control data transmission and data reception with respect to the user equipments 111 to 113. For example, the base stations 121 to 123 may transmit downlink scheduling information to corresponding user equipments 111 to 113 for downlink data. Based on the downlink scheduling information, the user equipments 111 to 113 may recognize a time, a frequency domain, a frequency band, an encoding scheme, a data size, and/or hybrid automatic repeat and request (HARQ) information to receive corresponding data. For uplink data, the base stations 121 to 123 may transmit uplink scheduling information to corresponding user equipments 111 to 113. Based on the uplink scheduling information, the user equipments 111 to 113 may recognize an available time to be used, an available frequency domain to be used, an encoding scheme, a data size, and/or HARQ related information to transmit corresponding data. An interface for user traffic and/or control traffic may be presented at the base stations 121 to 123.

The central office 130 may be coupled to the base stations 121 to 123 and may deliver or switch signals to/from the user equipments 111 to 113 in order to connect the user equipments 111 to 113 to other parties or to the core network 140. The central office 130 may include a switching system 131 and a digital unit 231, which are shown in FIG. 2.

The core network 140 may be a central part of a telecommunication network that provides various services to user equipments 111 to 113 through the base stations 121 to 123 and the central office 130.

Figure 2:
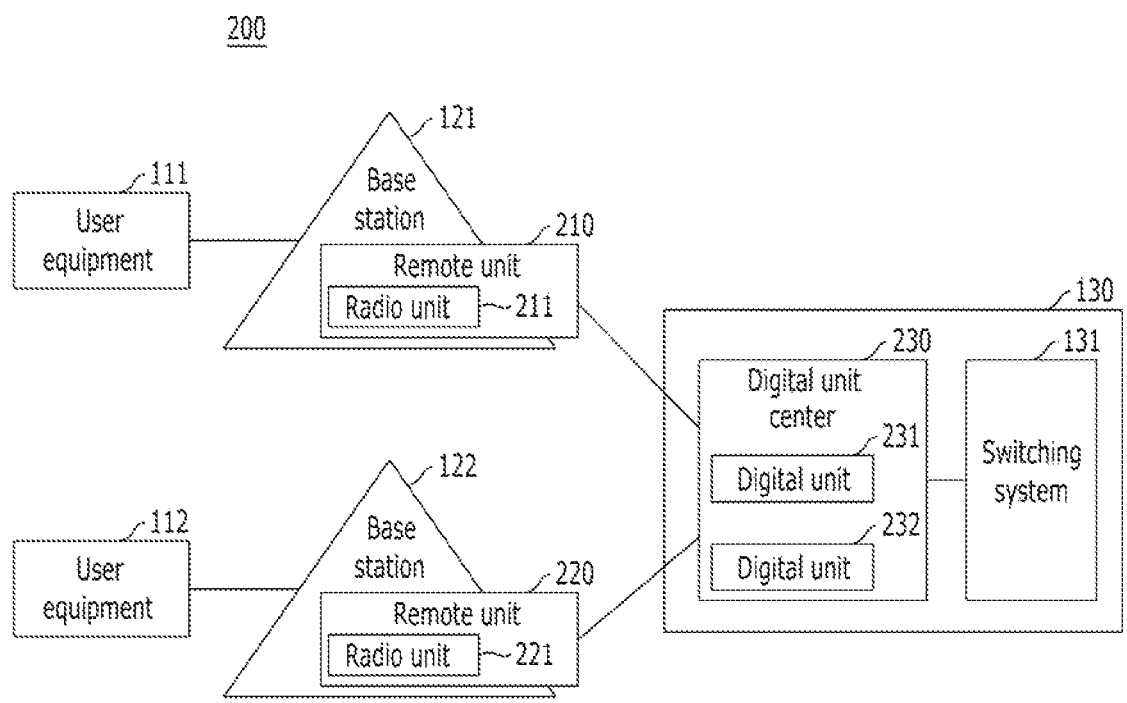
FIG. 2 illustrates a typical cloud communication center system.

FIG. 2 illustrates a typical cloud communication center system.

Referring to FIG. 2, a typical cloud communication center system 200 may include remote units 210 and 220 and a digital unit center 230. The digital unit center 230 may include a plurality of digital units 231 and 232. The radio units 210 and 220 and the digital unit center 230 may be located at difference locations. A typical base station may include a radio unit and a digital unit as single equipment. Unlike the typical base station, the base station 121 or 122 in the cloud communication center system 200 may include only the remote unit 210 or 220. The digital units 231 and 232 may be installed in the digital unit center 230 in the central office 130. The remote units 210 and 220 may be coupled to the respective digital units 231 and 232 through an optical interface such as a common public radio interface.

The radio units 211 and 221 may transmit and receive a radio signal to/from user equipments 111 and 112. The radio units 211 and 221 may simply transfer the received radio signal to one of the digital units 231 and 232 in the digital unit center 230 located at the central office 130.

The digital units 231 and 232 may receive the radio signal from the radio units 211 and 221 and process the received radio signal in accordance with an open system interconnection reference model, for example, a radio interface protocol. The radio interface protocol will be described in more detail later with reference to FIG. 3.

In order for smooth communication between the radio unit and the digital unit, an optical interface needs to support a data transmission rate of about 2.5 Gbps or more. Due to such requirements, the cloud communication center network may require high operating expenditure to maintain such an optical interface.

A processing load for processing a radio signal in accordance with the OSI is concentrated at the digital unit center 230. Accordingly, the digital unit center 230 requires a large amount of resources and high processing power as compared to the radio units 211 and 221 at the base stations 121 and 122. Furthermore, a processing load of the digital units 231 and 232 may be much higher than that of the remote units 210 and 220 because the digital units 231 and 232 need to process the radio signal in accordance with the OSI such as a radio interface protocol. Such a processing load difference may create delay in providing a related service to a user.

As described above, the digital unit center 230 may perform sub-layer functions in order to process a radio signal transferred from the radio units 211 and 221 in accordance with the open system interconnection reference model. Hereinafter, the sub-layer functions in a radio interface protocol will be described with reference to FIG. 3.

Figure 3:
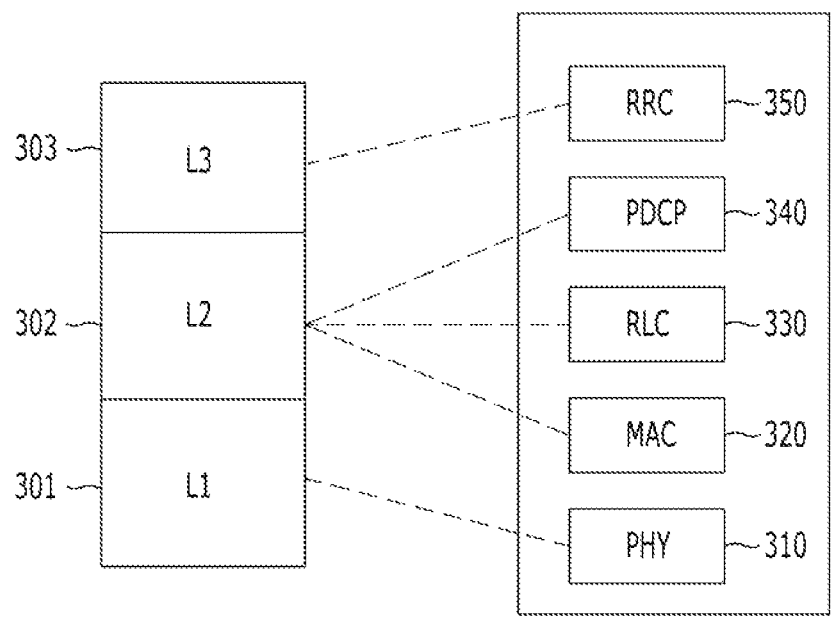
FIG. 3 illustrates a hierarchical structure of a radio interface protocol (RIP)

FIG. 3 illustrates a hierarchical structure of a radio interface protocol.

Referring to FIG. 3, the hierarchical structure of the radio interface protocol (RIP) may include a physical (PHY) layer 310, a media access control (MAC) layer 320, a radio link control (RLC) layer 330, a packet data convergence protocol (PDCP) layer 340, and a radio resource control (RRC) layer 350.

The protocol layers of the RIP may be classified into an L1 layer 301, an L2 layer 302, and an L3 layer 303 based on three sub-layers of an open system interconnection reference model. Accordingly, the PHY layer 310 may be referred to as the L1 layer 301, and the MAC layer 320, the RLC layer 330, and the PDCP layer 340 may be referred to as the L2 layer 302. Furthermore, the RRC layer 350 may be referred to as the L3 layer 303.

The PHY layer 310 may provide an information transfer service to an upper layer by using a physical channel. The PHY layer 310 may be coupled to an upper layer such as the MAC layer 320 through a transport channel. Data may be transferred between a PHY layer of a transmitting side and a PHY layer of a receiving side through a physical channel.

The MAC layer 320 may provide a service to an upper layer such as the RLC layer 330 through a logical channel. Functions of the RLC layer 330 may be implemented as a functional block inside the MAC layer 320. In this case, the RLC layer 330 may be omitted. The PDCP layer 340 may perform a header compression function in order to effectively transmit IP packets, for example, an Internet Protocol version 4 (IPv4) packet or an Internet Protocol version 6 (IPv6) packet, through a radio interface having a narrow bandwidth. The header compression function may reduce an amount of unnecessary control information.

The RRC layer 350 may be defined in only a control plane. The RRC layer 350 may manage the control of the logical channel, the transport channel, and the physical channel, in relation to configuration, reconfiguration, and release of radio bearers. The radio bearer may denote a service provided by the L2 layer 302 to transmit data between a user equipment and a related network. In order to transmit data, the RRC layer 350 may exchange an RRC message between a user equipment and a related network. When an RRC layer of a user equipment is connected to an RRC layer of a radio network, the user equipment is in an RRC connected mode, otherwise, the user equipment is in an idle mode.

Although it is not shown in FIG. 3, a non-access stratum (NAS) layer may be presented above the RRC layer. The NAS layer may perform a session management function and/or a mobility management function.

As described above, the digital units 231 and 232 of the typical cloud communication center system 200 may process a radio signal transferred from the remote units 210 and 220 in accordance with the open system interconnection reference model. That is, each digital unit 231 and 232 may perform functions of the L1 layer, the L2 layer, and the L3 layer in order to process the radio signal transferred from the radio units 210 and 220. Accordingly, the digital units 231 and 232 may have more processing load than that of the radio unit 210 and 220. Such a processing load difference may create delay in communication between the remote units 210 and 220 and the digital unit center 230.

Furthermore, since the remote units 210 and 220 may transmit a radio signal received from the user equipments 111 and 112 to the digital unit center 230, an optical interface between the remote units 210 and 220 and the digital unit center 230 may require a data transmit rate of about 2.5 Gbps or more, which can cause high operating expenditure.

In order to overcome such shortcomings of the typical cloud communication system 200, functions of sub-layers of an open system interconnection reference model may be divided into a remote unit and a digital unit center, in accordance with an embodiment of the present invention. For example, sub-layer functions divided into an L1 function and an L2/L3 function. The L1 function may be functions and services performed by the L1 layer of the open system interconnection reference model. The L2 function may denote functions and services performed by the L2 layer and the L3 layer of the open system interconnection reference model. The L1 function may be performed by a remote unit installed in a base station, and the L2/L3 function may be performed by a centralized unit installed in a central office, in accordance with an embodiment of the present invention. Hereinafter, a cloud communication center system in accordance with an embodiment of the present invention will be described with reference to FIGS. 4 and 5.

Figure 4:
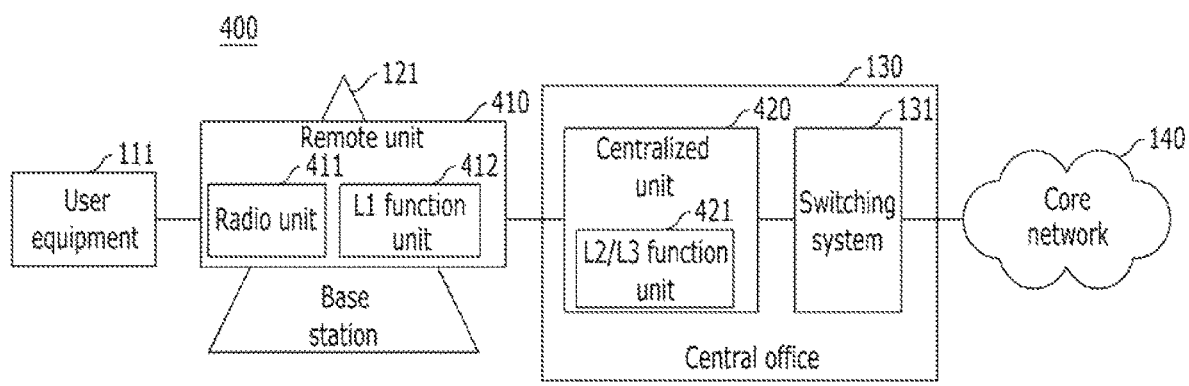
FIG. 4 illustrates a cloud communication center system in accordance with an embodiment of the present invention.

FIG. 4 illustrates a cloud communication center system in accordance with an embodiment of the present invention.

Referring to FIG. 4, the cloud communication center system 400 may include a remote unit 410 and a centralized unit 420. The remote unit 410 may be installed at a base station 121, and the centralized unit 420 may be installed at a central office 130 with a switching system 131.

The remote unit 410 may include a radio unit 411 and an L1 function unit 412. The radio unit 411 may perform functions similar to that of the radio unit 211 of the typical cloud communication center network 200. For example, the radio unit 411 may transmit and receive radio signals to/from a user equipment 111. The radio unit 411 may include an up-conversion module, a down-conversion module, a power amplifier, and/or a filter.

In accordance with an embodiment of the present invention, the remote unit 410 may include the L1 function unit 412, and the L1 function unit 412 may receive a radio signal from the radio unit 411 and perform an L1 function of an open system interconnection reference model in order to process the radio signal. For example, the L1 processor 412 may perform L1 functions related to functions and services performed and provided based on the L1 layer, which were previously performed by a digital unit in the typical cloud communication center system. After processing the radio signal in accordance with the L1 layer, the L1 function unit 412 may transmit the processed signal to the centralized unit 420 located at the central office 130, through an inter-protocol interface such as an L1/L2 interface.

The centralized unit 420 may be installed at the central office 130 with the switching system 131. The centralized unit 420 may include an L2/L3 function unit 421. The L2/L3 function unit 421 may be coupled to the L1 function unit 412 of the remote unit 410 through the inter-protocol interface such as an L1-L2 interface. The L2/L3 function unit 421 may receive a signal from the L1 function unit 412 after being processed in accordance with the L1 layer. The L2/L3 function unit 421 may perform functions and services in accordance with an L2 layer and an L3 layer.

In addition, the centralized unit 420 may be coupled to the core network 140 through the switching system 131 to transmit the processed signal to other parties or to the core network 140 through the switching system 131.

As described above, the remote unit 410 and the centralized unit 420 may be separately installed in different locations. The remote unit 410 may be installed in the base station 121, and the centralized unit 420 may be installed in the central office 420. The remote unit 410 and the centralized unit 420 may be coupled together through the L1/L2 interface that requires a data transmission rate of about hundreds of megabits per second (Mbps). The remote unit 410 may process a radio signal from a user equipment 111 using the L1 function unit 412. The remote unit 410 transmits the processed signal to the centralized unit 420 after processing the radio signal from the user equipment 111 based on the L1 layer of the open system interconnection reference mode. The centralized unit 420 may receive the processed signal from the remote unit 410, and the L2/L3 function unit may process the signals from the remote unit 410 based on the L2 layer and the L3 layer of the open system interconnection reference model. As described above, the processing load for processing signals from the user equipment 111 is distributed to the remote unit 410 and to the centralized unit 420.

Since the remote unit 410 transmits a radio signal from the user equipment 111 after processing the radio signal in accordance with an L1 layer, a process load of the centralized unit 420 may be reduced as compared to that of the digital unit 231 of the typical cloud communication center system 200 of FIG. 2. For example, a process load of a digital unit for processing signals in accordance with an L1 layer is more than about 90% of the total process load of processing a radio signal from a user equipment. Since the L1 function unit 412 of the remote unit 410 may perform functions and provide services in accordance with the L1 layer, the process load of the centralized unit 420 is reduced by about 90% as compared to that of the digital unit 231 of the typical cloud communication center network 200.

The remote unit 410 and the centralized unit 420 may be coupled together through an inter-protocol layer interface, for example, an L1-L2 interface. Since the L1 function unit 412 of the remote unit 410 processes signals in accordance with the L1 layer and the L2/L3 function unit 421 of the centralized unit 420 processes signals in accordance with the L2 and L3 layers, an interface between the remote unit 410 and the centralized unit 420 only requires exchanging necessary data between an L1 layer and an L2 layer. The L1-L2 interface may couple together the remote unit 410 and the centralized unit 420 and the L1-L2 interface may require a lower data transmission rate than an optical interface coupling the radio unit 210 to the digital unit center 230 of the typical cloud communication center network 200. For example, the optical interface requires a data transmission rate of 2.5 Gbps or more. The L1/L2 interface may require a data transmission rate of about hundreds of Mbps. Accordingly, the cloud communication center system 400 in accordance with an embodiment of the present invention requires less operating expenditure because of the L1/L2 interface and less processing power is required for the central office 130.

The open system interconnection reference model may be a radio interface protocol for a third generation partnership project (3GPP) communication network. In this case, the L1 layer may denote a physical (PHY) layer and the L2 layer may denote at least one of the MAC layer, the RLC layer, the PDCP layer and a combination thereof. The L3 layer may denote the RRC layer. Also, the L1/L2 interface may be a transport channel coupling the PHY layer to the MAC layer. Furthermore, the remote unit 410 may include an L1 function and the centralized unit may include an L2/L3 function. However, the present invention is not limited thereto.

Figure 5:
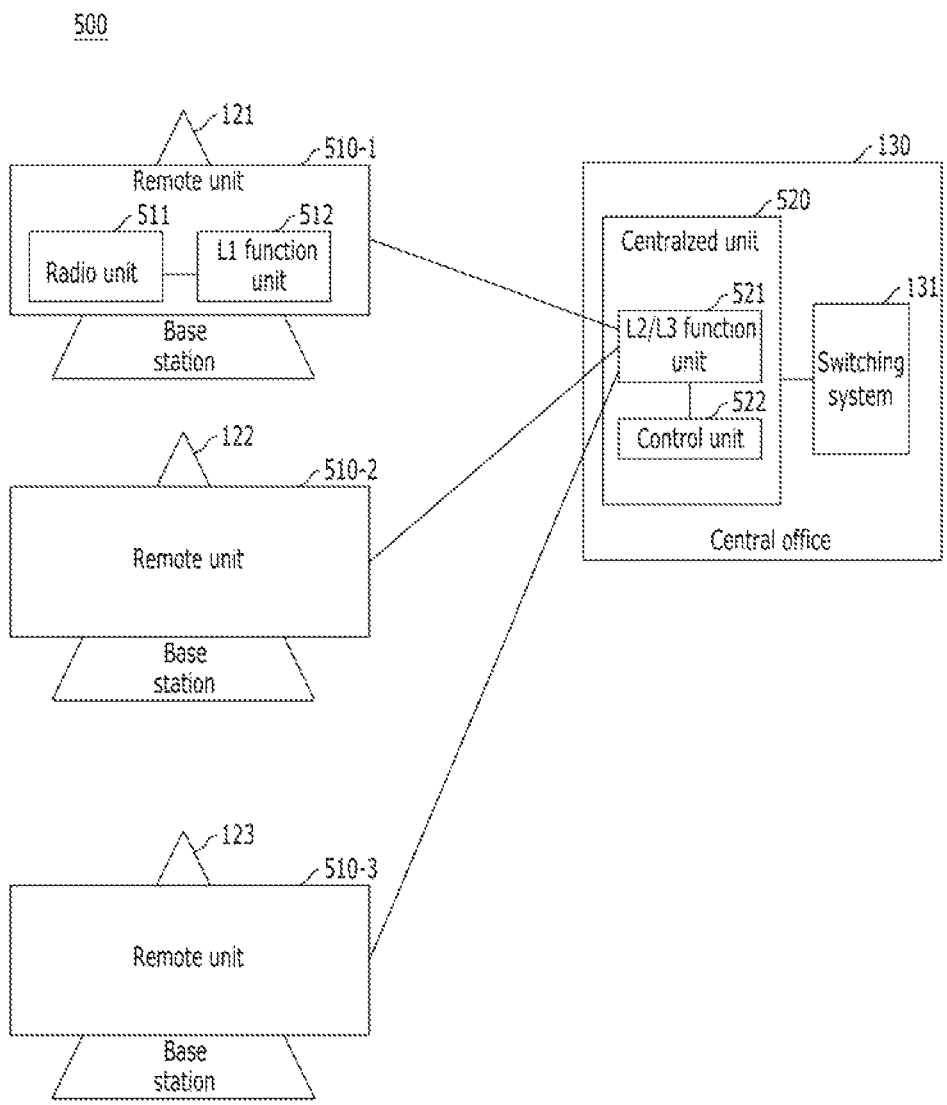
FIG. 5 illustrates a cloud communication center system in accordance with another embodiment of the present invention.

FIG. 5 illustrates a cloud communication center system in accordance with another embodiment of the present invention.

Referring to FIG. 5, a cloud communication center system 500 may include a plurality of remote units 510-1 to 510-3 and a centralized unit 520. The plurality of remote units 510-1 to 510-3 may be installed at base stations 121 to 123, respectively. The centralized unit 520 may be installed at a central office 130 with a switching system 131. The plurality of remote units 510-1 to 510-3 may be coupled to the centralized unit 520 through an inter-protocol interface, such as an L1-L2 interface that may couple together the L1 layer and the L2 layer in accordance with an open system interconnection reference model.

Each one of the remote units 510-1 to 510-3 may include a radio unit 511 and an L1 function unit 512. The radio unit 511 and the L1 function unit 512 may perform similar functions as that of the radio unit 410 and the L1 function unit 420 of FIG. 4, respectively. Accordingly, further descriptions thereof are not described herein.

The centralized unit 520 may include an L2/L3 processor 521 and a control unit 522.

The L2/L3 processor 521 may perform an L2 function and an L3 function to process the signal from the plurality of remote units 510-1 to 510-3 in accordance with an open system interconnection reference model. As described above, the L2 function may denote functions performed and services provided based on an L2 layer of the open system interconnection reference model. The L3 function may denote functions performed and services provided based on an L3 layer of the open system interconnection reference model.

The control unit 522 may perform systematic scheduling with respect to the plurality of remote units 510-1, 510-2, and 510-3. As shown in FIG. 5, the single centralized unit 520 may be coupled to the plurality of remote units 510-1, 510-2 and 510-3 through an inter-protocol interface. Accordingly, the single centralized unit 520 may include the control unit 522 in order to effectively communicate with the plurality of remote units 510-1, 510-2 and 510-3 according to a predetermined scheduling scheme.

The centralized unit 520 may communicate with the plurality of remote units 510-1, 510-2 and 510-3 based on a multihop scheme or a single hop scheme. For example, the centralized unit 520 may be serially coupled to the plurality of remote units 510-1, 510-2 and 510-3, or only coupled to one of the remote units 510-1, 510-2 and 510-3. The centralized unit 520 may perform a 1:1 communication with the remote units 510-1, 510-2 and 510-3 in a single hop scheme. In this case, time delay may be reduced.

The control unit 522 of the centralized unit 520 may control signal transmission and reception through the plurality of remote units 510-1, 510-2 and 510-3. For example, the control unit 522 may control signal mapping relation between the centralized unit 520 and the remote units 510-1 to 510-3, traffic-flows of the remote units 510-1 to 510-3, power of the remote units 510-1 to 510-3, and multiplexing/demultiplexing signals of the remote units 510-1 to 510-3. The control unit 522 may separately control the remote units 510-1 to 510-3. Alternatively, the control unit 522 may control the remote units 510-1 to 510-3 as a remote unit group. The control unit 522 may also be referred to as a switching module or a multiplexing/demultiplexing module.

Furthermore, the control unit 522 may enable the centralized unit 520 to control the plurality of remote units 510-1, 510-2 and 510-3 in a time division scheme. To be specific, the communication between the centralized unit 520 and the remote units 510-1 to 510-3 may be divided according to the time division scheme. Accordingly, the centralized unit 520 may communicate with one of the remote units 510-1 to 510-3 in a respective time period. The centralized unit 520 may communicate with another remote unit in a next time period. In addition, the control module 522 may control an amount of data traffic flowing from the centralized unit 520 to the remote units 510-1, 510-2 and 510-3. The amount of data traffic may be controlled depending on priorities given to the remote units 510-1, 510-2 and 510-3. The priority may be given by a network operator, or may be given based on time-variant, by considering the number of user equipments coupled to a respective remote unit, and/or based on quality of service (QoS) required for the remote units. For example, when using the time division control, the traffic control may be performed by adjusting an amount of data traffic per unit time, which is provided to a corresponding remote unit, or by adjusting the number of unit time allocated to the corresponding remote unit.

When the plurality of remote units 510-1, 510-2 and 510-3 are coupled to the single centralized unit 520, the remote units 510-1, 510-2 and 510-3 may be included in the same cell or in different cells. When the remote units 510-1, 510-2 and 510-3 are included in the same cells, the same reference signal pattern may be given to the respective remote units 510-1, 510-2 and 510-3. On the other hand, when the remote units 510-1, 510-2 and 510-3 are included in different cells, different reference signal patterns may be given to the respective remote units 510-1, 510-2 and 510-3. The same reference signal pattern given to the remote units 510-1, 510-2 and 510-3 in the same cells may increase transmission reliability. The different reference signal pattern given to the remote units 510-1, and 510-2, and 510-3 may increase a data transmission rate.

Meanwhile, when the plurality of remote units 510-1, 510-2 and 510-3 are coupled to the single centralized unit 520, a delay may be generated between a transmission time of the centralized unit 520 and a reception time of the respective remote units 510-1, 510-2 and 510-3 depending on the locations of the centralized unit 520 and the remote units 510-1, 510-2, and 510-3. Such a delay may cause a transmission time difference in signals transmitted from the centralized unit 520 to user equipments. On the contrary, the delay may also cause a transmission time difference in signals transmitted from user equipments to the centralized unit 520. To solve these problems, the centralized unit 520 may calculate signal transmission times of signals transmitted from the centralized unit 520 and signal reception times of the signals arrived at the remote units 510-1, 510-2 and 510-3. The centralized unit 520 may calculate a time difference between the transmission time and the reception time of the respective remote unit 510-1, 510-2 and 510-3 based on the calculated signal transmission and reception times. Using this information, the centralized unit 520 may adjust a signal transmission time and a signal reception time between the centralized unit 520 and the respective remote unit 510-1, 510-2 and 510-3.

As described above, the single centralized unit 520 may process data traffic from a plurality of remote units 510-1 to 510-3, in accordance with an embodiment of the present invention. The processing load is distributed to the centralized unit 520 and the remote units 510-1 to 510-3 for processing a radio signal from the user equipment. Accordingly, the single centralized unit 520 may process more data traffic from the remote units 510-1 to 510-3 using comparatively less processing power.

Furthermore, an L1/L2 interface between the remote unit and the centralized unit 520 is only required to support a data transmission rate of about hundreds of Mbps, which requires much less operating expenditure than the optical interface between the radio unit and the digital unit of the typical cloud communication center system.

Hereinafter, a method for processing a radio signal in a cloud communication center system, in accordance with an embodiment of the present invention, will be described with reference to FIG. 6.

Figure 6:
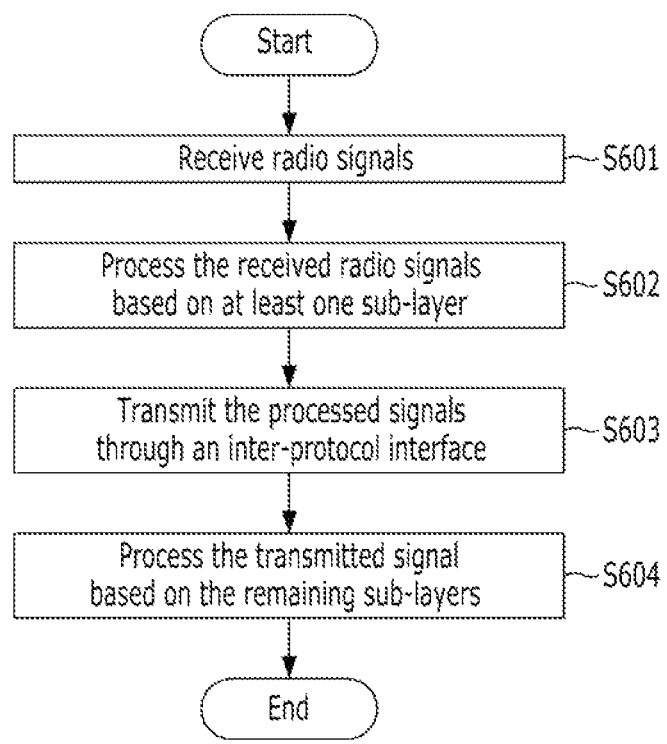
FIG. 6 is a flowchart illustrating a method for processing a radio signal in a cloud communication center system, in accordance with an embodiment of the present invention.

FIG. 6 is a flowchart that illustrates a method for processing a radio signal in a cloud communication center system, in accordance with an embodiment of the present invention.

Referring to FIG. 6, a radio signal may be received S601. For example, a radio unit of a remote unit may receive a radio signal from a user equipment or a central office. The remote unit may be installed at a base station in a respective service area.

The received radio signal may be processed in accordance with at least one sub-layer of an open system interconnection reference model S602. For example, an L1 function unit of the remote unit may process the received radio signal in accordance with an L1 layer of the open system interconnection reference model. In the case of a radio interface protocol of the 3GPP communication network, the L1 function unit may process the received radio signal based on a PHY layer.

The processed signal may be transmitted through an inter-protocol interface S603. For example, the processed signal may be transmitted to a centralized unit installed at a central office. Herein, the processed signal may pass through the inter-protocol interface such as an L1/L2 interface between the remote unit at the base station and the centralized unit at the central office. In the case of the radio interface protocol of the 3GPP communication network, the L1/L2 interface may be a transport channel coupling the PHY layer to a MAC layer.

The transmitted signal may be processed in accordance with the remaining sub-layers of the open system interconnection reference model S604. For example, the L2/L3 function unit of the centralized unit may process the signal based on the L2 function and the L3 function of the open system interconnection reference mode. In the case of the 3GPP communication network, the L2/L3 function unit may process the transmitted radio signal based on a MAC layer, a RLC layer, a PDCP layer, and a RRC layer.

After processing the signal, the processed signal may be transmitted to other parties or to a core network through a switching system, or to the user equipment through the base station.

The above-described embodiments of the present invention may also be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

The term "coupled" has been used throughout to mean that elements may be either directly connected together or may be coupled through one or more intervening elements.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for supporting a cloud communication system, the apparatus comprising:
   a first processing unit installed with at least one remote unit i) installed at a service area for forming a cell as a part of a base station, ii) configured to receive a radio signal from a user equipment, generate a first processed signal by processing the received radio signal based on a physical layer and transmit the first processed radio signal, and iii) configured to receive a second processed signal, process the received second processed signal based on the physical layer and transmit a resultant signal as a radio signal to the user equipment; and
   a second processing unit installed with a centralized unit, as a remaining part of the base station and connected to a core network though a switching system a) physically located at a place separated from at least one remote unit, b) configured to receive the first processed signal from the at least one remote unit, process the first processed signal based on a media control layer, a radio link control layer, a packet data convergence protocol layer and a radio resource control layer of the radio interface protocol, and transmit a resultant signal to a core network, and c) configured to receive a signal from the core network, generate the second processed signal by processing the received signal according to the media control layer, the radio link control layer, the packet data convergence protocol layer and the radio resource control layer of the radio interface protocol, and transmit the second processed signal to the at least one remote unit,
   wherein the at least one remote unit and the centralized unit perform operations together as one base station.

2. The apparatus of claim 1, wherein the at least one remote unit comprises:
   a radio unit configured to control a transmission of a radio signal to the user equipment and a reception of a radio signal from the user equipment; and
   a physical layer unit configured to process at least one of the radio signal to be transmitted to the user equipment and the radio signal to be received from the user equipment, using the physical layer.

3. The apparatus of claim 1, wherein the at least one remote unit is installed at a base station and the centralized unit is installed at a central office.

4. The apparatus of claim 3, wherein the central office is connected to the core network of a mobile communication system.

5. The apparatus of claim 1, wherein the at least one remote unit is coupled to the centralized unit through an inter-protocol interface.

6. The apparatus of claim 5, wherein the inter-protocol interface comprises an L1/L2 interface that couples together an L1 layer and an L2 layer.

7. The apparatus of claim 1, wherein the radio interface protocol is based on an open system interconnection reference model.

8. A method of processing a radio signal at a cloud communication center system, the method comprising:

receiving, at a remote unit, a radio signal from a user equipment, wherein the remote unit is installed at a service area for forming a cell as one part of a base station;

processing, at the remote unit, the received radio signal based on a physical layer of a radio interface protocol of an open system interconnection reference model, and generating a first processed signal as a result of processing;

transmitting, by the remote unit, the first processed radio signal to a centralized unit through an inter-protocol interface of the open system interconnection reference model, wherein the centralized unit is installed at a place separated from the remote unit, as a remaining part of the base station and connected to a core network through a switching system;

processing, at the centralized unit, the first processed radio signal based on a media access control layer, a radio link control layer, a packet data convergence protocol layer and a radio resource control layer of the radio interface protocol of the open system interconnection reference model and transmitting a resultant signal to a core network;

receiving, at the centralized unit, a signal from the core network, processing, as the second processed signal, the received signal according to the media access control layer, the radio link control layer, the packet data convergence protocol layer and the radio resource control layer of the radio interface protocol, and transmitting the second processed signal to the remote unit; and receiving, at the remote unit, the second processed signal from the centralized unit, processing the received second processed signal based on the physical layer of the radio interface protocol, and transmitting a resultant signal, as the radio signal, to the user equipment, wherein the at least one remote unit and the centralized unit perform operations together as one base station.

9. An apparatus for supporting a cloud communication system, the apparatus comprising:
at least one remote unit i) installed at a service area for forming a cell as one part of a base station, ii) configured to receive a radio signal from a user equipment, generate a first processed signal by processing the received radio signal based on a physical layer function of a radio interface protocol, and transmit the first processed signal, and iii) configured to receive a second processed signal, process the received second processed signal, and transmit a resultant signal as the radio signal to the user equipment; and
a centralized unit a) installed at a location separated from the at least one remote unit, as a remaining part of the base station and connected to a core network through a switching system, b) configured to receive the second processed signal from the at least one remote unit, process the received second processed signal based on a media access control layer function, a radio link control layer function, a packet data convergence protocol layer function and a radio resource control layer function of the radio interface protocol, and transmit a resultant signal to the core network, and c) configured to receive a signal from the core network, generate the second processed signal by processing the received signal based on the media access control layer function, the radio link control layer function, the packet data convergence protocol layer function and the radio resource control layer function of the radio interface protocol, and transmit the second processed signal to the at least one remote unit,
wherein the at least one remote unit and the centralized unit perform operations together as the one base station.

10. The apparatus of claim 9, wherein the radio interface protocol comprises an L1 layer, an L2 layer and an L3 layer.

11. A cloud communication system comprising:
at least one base station i) installed at a service area for forming a cell ii) configured to receive a radio signal from a user equipment, and iii) configured to receive a second processed signal as a radio signal to be transmitted to the user equipment, and wherein the at least one base station includes a first processing unit i) configured to generate a first processed signal by processing the received radio signal based on a physical layer of a radio interface protocol, and transmit the first processed radio signal, and ii) configured to process the received second processed signal based on the physical layer of the radio interface protocol, and transmit a resultant signal as a radio signal to the user equipment; and
a central office physically located at a place separated from the at least one base station connected to a core network through a switching system and performs operations together with the at least one base station as a single base station, and wherein the central office includes a second processing unit a) configured to receive the first processed signal from the first processing unit, generate a resultant signal by processing the first processed signal based on a media access control layer, a radio link control layer, a packet data convergence protocol layer and a radio resource control layer of the radio interface protocol, and transmit the resultant signal to the core network, and b) configured to receive a signal from the core network, generate the second processed signal by processing the received signal according to the media access control layer, the radio link control layer, the packet data convergence protocol layer and the radio resource control layer of the radio interface protocol, and transmit the second processed signal to the at least one base station.

12. The cloud communication system of claim 11, wherein the at least one base station and the central office are coupled together through an inter-protocol interface.

13. The cloud communication system of claim 12, wherein the inter-protocol interface comprises a transport channel that couples together a physical layer and a media access control layer of the radio interface protocol.

14. The cloud communication system of claim 11, wherein the radio interface protocol is based on an open system interconnection reference model.

* * * * *